J. R. COOK.
SUPPORT FOR ELECTRIC CONTROLLERS.
APPLICATION FILED DEC. 15, 1916.
1,323,350. Patented Dec. 2, 1919.
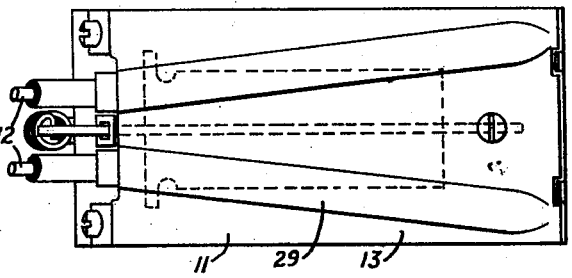
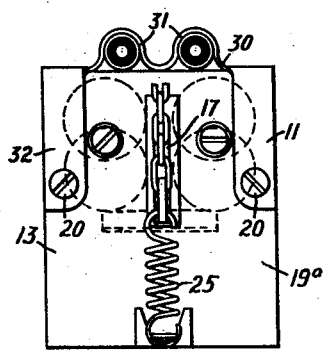
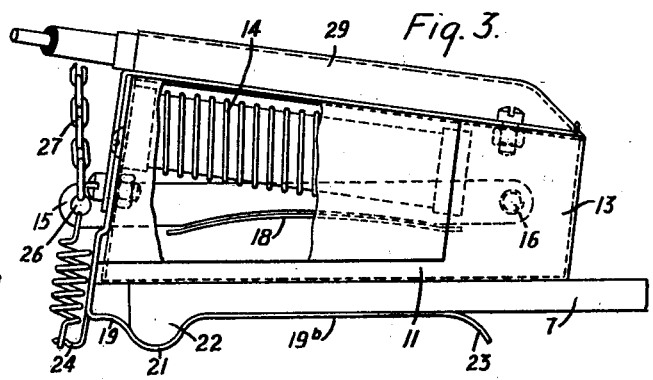
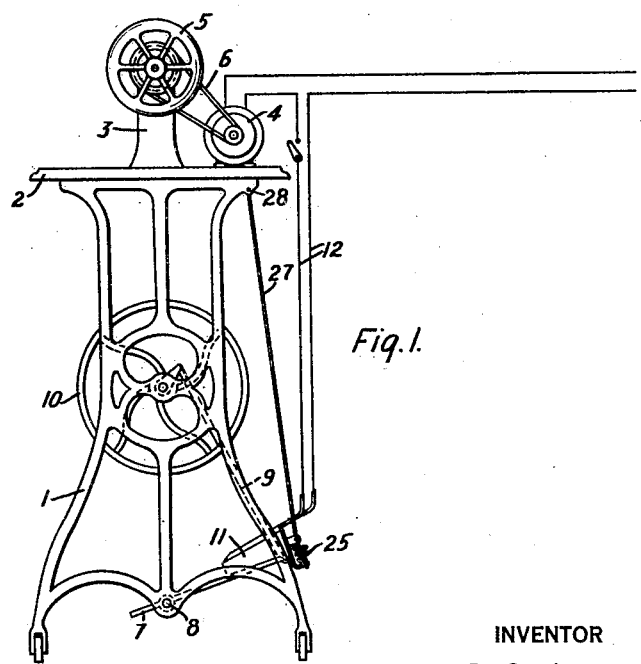
WITNESSES:
Fred. A. Lind
O. W. Kennedy
INVENTOR
Joel R. Cook
BY
Wesley G. Carr
ATTORNEY

UNITED STATES PATENT OFFICE.

JOEL R. COOK, OF WILKINSBURG, PENNSYLVANIA, ASSIGNOR TO WESTINGHOUSE ELECTRIC & MANUFACTURING COMPANY, A CORPORATION OF PENNSYLVANIA.

SUPPORT FOR ELECTRIC CONTROLLERS.

1,323,350.     Specification of Letters Patent.     Patented Dec. 2, 1919.

Application filed December 15, 1916. Serial No. 137,221.

*To all whom it may concern:*

Be it known that I, JOEL R. COOK, a citizen of the United States, and a resident of Wilkinsburg, in the county of Allegheny and State of Pennsylvania, have invented a new and useful Improvement in Supports for Electric Controllers, of which the following is a specification.

My invention relates to supports for electric controllers such as are adapted for use in connection with electric motors of small horse power, and it has for its object to provide a novel form of support that will enable such controllers to be operated in the most advantageous manner when employed to control the operation of electric motors that are connected to sewing machines or similar mechanisms.

In my copending application, Serial No. 38,158, filed July 6, 1915, I have shown and described a form of controller that is particularly adapted for use in connection with electric motors of small horse power. My controller generally comprises a pair of resistors of the form in which the resistance element is wound upon a cylinder of insulating material, the resistors being connected in series with the motor to be controlled. The resistors are adapted to be gradually shunted by means of a curved resilient conductor which is mounted upon a pivoted lever located between the cylindrical resistors. This lever has heretofore been connected to a pivotally mounted cover of the controller box so that engagement between the resilient conductor and the resistors could be effected by merely applying pressure to the pivoted cover. By reason of this arrangement, the controller could be operated most advantageously by placing it upon the floor and actuating the lever by direct foot pressure upon the box.

According to the present invention, I provide a novel form of support for the above-described controller by means of which it may be readily applied to the mechanism of a sewing machine. It is well known that most sewing machines have heretofore been operated and controlled by the application of foot power to a suitable treadle. It is obvious, therefore, that it would be most desirable if the operation of sewing machines that are driven by electric motors could be controlled by movements of the treadle. I, therefore, propose to mount a controller of the above-described type upon the treadle of a sewing machine so that simple foot movements on the part of the operator will result in an acceleration or deceleration of the electric driving motor.

In the accompanying drawing, Figure 1 is a view, in end elevation, of a motor-driven sewing-machine mechanism provided with a controller arranged in accordance with my invention; and Figs. 2, 3 and 4 are views, in plan and in side and end elevations, respectively, of the controller and support shown in Fig. 1.

The sewing machine comprises a supporting stand 1 and a table 2 upon the top of which is mounted a sewing machine mechanism 3 of the usual type. The sewing-machine mechanism 3 is adapted to be driven by an electric motor 4 that is also mounted upon the table 2 and is operatively connected to the driving-wheel 5 of the sewing machine 3 by means of a belt 6. A foot-power mechanism is mounted on the stand 1 and comprises a treadle 7 pivoted to the stand at 8 and adapted to transmit its motion through a connecting rod 9 to the crank of a main driving wheel 10, the crank and driving wheel being shown in dotted lines, as they form no part of the present invention. The controller 11 is mounted on the treadle 7 and is connected, in series-circuit relation with the motor 4, to a suitable source of electrical energy through electric conductors 12.

Referring now to Figs. 2, 3 and 4, the controller 11 comprises a box 13 within which are mounted cylindrically-wound resistor units 14 in side-by-side relation. A lever 15 is pivotally supported, at one end, at the point 16, the free end of the lever projecting beyond the end of the box 13 through a slot 17. The lever 15 is adapted to move between the resistor units 14 and is provided with a curved conducting plate 18 that is adapted to engage the resistor units, in a manner to be hereinafter described. A substantially L-shaped supporting member 19, preferably formed of a suitable inherently resilient material, such as sheet steel, is secured to the end of the box 13 by means of bolts 20 coacting with one leg 19$^a$ thereof. The other leg 19$^b$ is provided with a curved off-set portion 21 that is adapted to receive the flange 22 which is usually provided at the end of the treadle 7, the end of the leg 19ᵇ being flared outwardly at 23 to permit the passage of the flange 22 between the support 19 and the bottom of the box 13. The leg 19ᵇ is further provided with a punched-out projecting portion or tongue 24 to which is secured one end of a coil spring 25. The other end of the spring 25 is engaged in an opening 26 provided in the free end of the lever 15. The spring 25 normally tends to bias the lever 15 and the conducting plate 18 away from the resistor units 14. As best shown in Fig. 1, a wire or chain 27 is secured, at one end, in the opening 26 of the lever and, at its other end, to a fixed point 28 on the supporting stand 1. The box 13 is further provided with a conductor shield 29 which comprises a plate 30 provided with channels 31 and fingers 32 extending at right angles to the plate 30, by means of which the shield 29 is secured to the box 13 by means of the bolts 20. The electric conductors 12 are located in the channels 31.

When the treadle 7 is in the position shown in Fig. 1, the spring 25 holds the conducting plate 18 out of engagement with the resistor units 14 so that the motor 4 is adapted to start with the entire resistance of the controller in series therewith. When the operator desires to accelerate the motor, a downward pressure of the foot upon the treadle 7 will cause the lever 15 to be pulled upwardly about its pivot 16 by reason of the fixed connection of the chain 27 with relation to the stationary supporting stand 1. The resistor units 14 will thus be gradually shunted in accordance with the amount of movement of the treadle 7, so that the sewing machine mechanism will speed up in response to a usual and natural movement on the part of the operator. When the foot pressure on the treadle is relieved, the spring 25 will tend to contract and the treadle will be returned to its former position by reason of the connection of the spring with the chain 27.

While I have shown my invention as applied to a particular type of controller, it is not so limited but may be as readily applied to any type of controller, the operation of which is dependent upon the movement of a pivoted member and I desire, therefore, that only such limitations be imposed thereon as may come within the scope of the appended claims.

I claim as my invention:

1. The combination with a supporting stand, a machine to be driven and a motor operatively connected thereto mounted on said stand, and a pedal pivotally connected to said stand, of a variable-speed controller for said motor removably mounted on said pedal and adapted to be actuated by the movement thereof.

2. The combination with a supporting stand, a machine to be driven and a motor operatively connected thereto mounted on said stand, and a pedal pivotally connected to said stand, of a variable-control resistor for said motor removably mounted on said pedal, the said resistor being adapted to be actuated by the movement of said pedal.

3. The combination with a supporting stand, a machine to be driven and a motor operatively connected thereto mounted on said stand, and a pedal pivotally connected to said stand, of a variable speed controller for said motor removably mounted on said pedal and comprising a pivoted lever and means for transmitting the movement of said pedal to said lever.

4. The combination with a supporting stand, a machine to be driven and a motor operatively connected thereto mounted on said stand, and a pedal pivotally connected to said stand, of a variable-speed controller for said motor removably mounted on said pedal and comprising a pivoted lever connected, at its free end, to a fixed point on said supporting stand.

5. The combination with a supporting stand, a machine to be driven and a motor operatively connected thereto mounted on said stand, and a pedal pivotally connected to said stand, of a variable speed controller for said motor removably mounted on said pedal and comprising a pivoted lever connected, at its free end, to a fixed point on said supporting stand, and means for biasing said lever away from said fixed point.

6. The combination with a supporting stand, a machine to be driven and a motor operatively connected thereto mounted on said stand, and a pedal pivotally connected to said stand, of a variable speed controller for said motor removably mounted on said pedal and comprising a pivoted lever and a spring connected at its ends to a point on said controller and to said lever for biasing said lever away from said fixed point.

In testimony whereof, I have hereunto subscribed my name this 24th day of Nov., 1916.

JOEL R. COOK.